(12) United States Patent
Kurosawa et al.

(10) Patent No.: US 6,296,115 B1
(45) Date of Patent: Oct. 2, 2001

(54) CASE FOR CONTAINING DISK TYPE RECORDING MEDIUM

(75) Inventors: Masashi Kurosawa, Saitama; Toshiyasu Kondo, Tokyo, both of (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/578,494

(22) Filed: May 26, 2000

(30) Foreign Application Priority Data

May 28, 1999 (JP) .................................................. 11-149355

(51) Int. Cl.[7] .................................................... B65D 85/57
(52) U.S. Cl. .................................... 206/308.1; 206/308.3; 360/133; 369/291
(58) Field of Search .................................... 206/303, 307, 206/307.1, 308.1, 308.3, 310; 360/133; 369/289, 291

(56) References Cited

U.S. PATENT DOCUMENTS 4,458,282 * 7/1984 Mui et al. ............................ 360/133
5,208,802 * 5/1993 Suzuki et al. ........................ 360/133
5,475,674 * 12/1995 Yamashita et la. ................... 369/291
5,768,253 * 6/1998 Triccart ................................ 369/291

* cited by examiner

*Primary Examiner*—Jim Foster
(74) *Attorney, Agent, or Firm*—Sughrue, Mion, Zinn, Macpeak & Seas, PLLC (57) ABSTRACT

A case 1 for containing a disk type recording medium 2 provided with a center bore 5, a clamped part 3 and a recording part 4 comprises a cartridge 6 and a protective case 7 which is detachably mounted on the cartridge. The cartridge 6 consists of a lid body 11 including a center opening 27 and a first annular projection 28 formed around the center opening 27, and a cartridge body 12 including a center opening 16 and an opening 17. The clamped part 3 of the disk type recording medium 2 is adapted to be exposed through the center openings 16 and 27. The protective case 7 includes a plate part 29, a second annular projection 33 and an engaging portion 34. The second annular projection 33 enters into the center opening 16. The disk type recording medium 2 is positioned between the annular projections 28 and 33 with the engaging portion 34 engaged with the center bore 5.

5 Claims, 6 Drawing Sheets

CASE FOR CONTAINING DISK TYPE RECORDING MEDIUM

BACKGROUND OF THE INVENTION

1. Field of the Invention

The present invention relates to a case for containing disk type recording medium, in particular, an optical disk, an optical magnetic disk or the like which is employed in an information recording apparatus such as a data filing apparatus and an image filing apparatus, etc.

2. Description of the Related Art

When the disk type recording medium such as the magnetic disk, optical disk, or optical magnetic disk is loaded into an information recording apparatus, such as a player for playing back information recorded in the disk or a recorder for writing information on the disk, the disk type recording medium has been conventionally loaded manually or loaded together with an exclusive case.

In case where the disk type recording medium is manually loaded into the information recording apparatus, a surface of the disk type recording medium is likely to be damaged with dusts, scratches, fingerprints, etc. These dusts, scratches or fingerprints will sometimes deteriorate reliability of the disk type recording medium in the event of recording and reproducing the information, particularly in recording the information, and as a result, a desired information may not be recorded. In case of recording information especially in the disk type recording medium having a high recording density such as a digital versatile disk (hereinafter referred to as DVD), there has been a fear that a desired information may not be accurately recorded.

Figure 5:
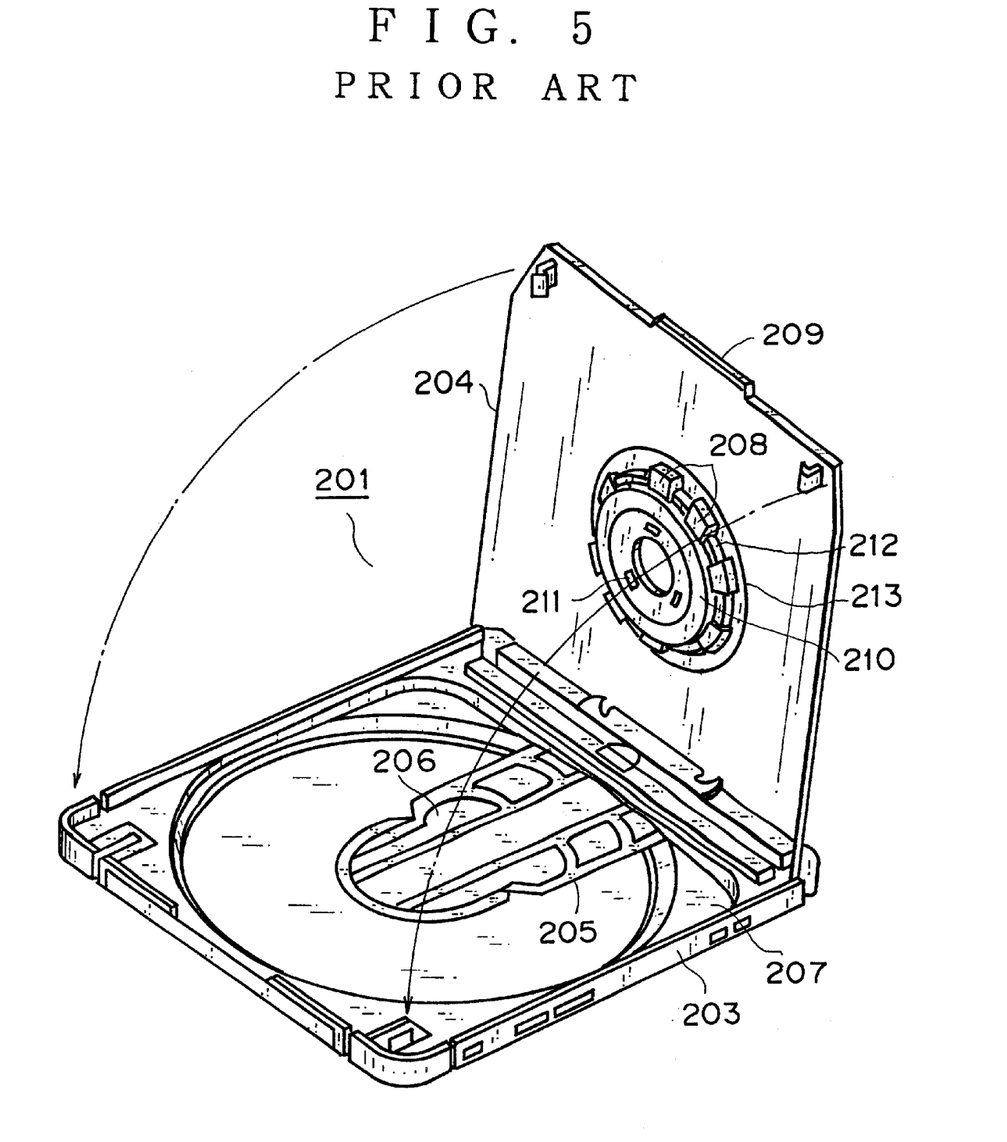
FIG. 5 is a perspective view of a conventional cartridge for containing the disk type recording medium.
Figure 6:
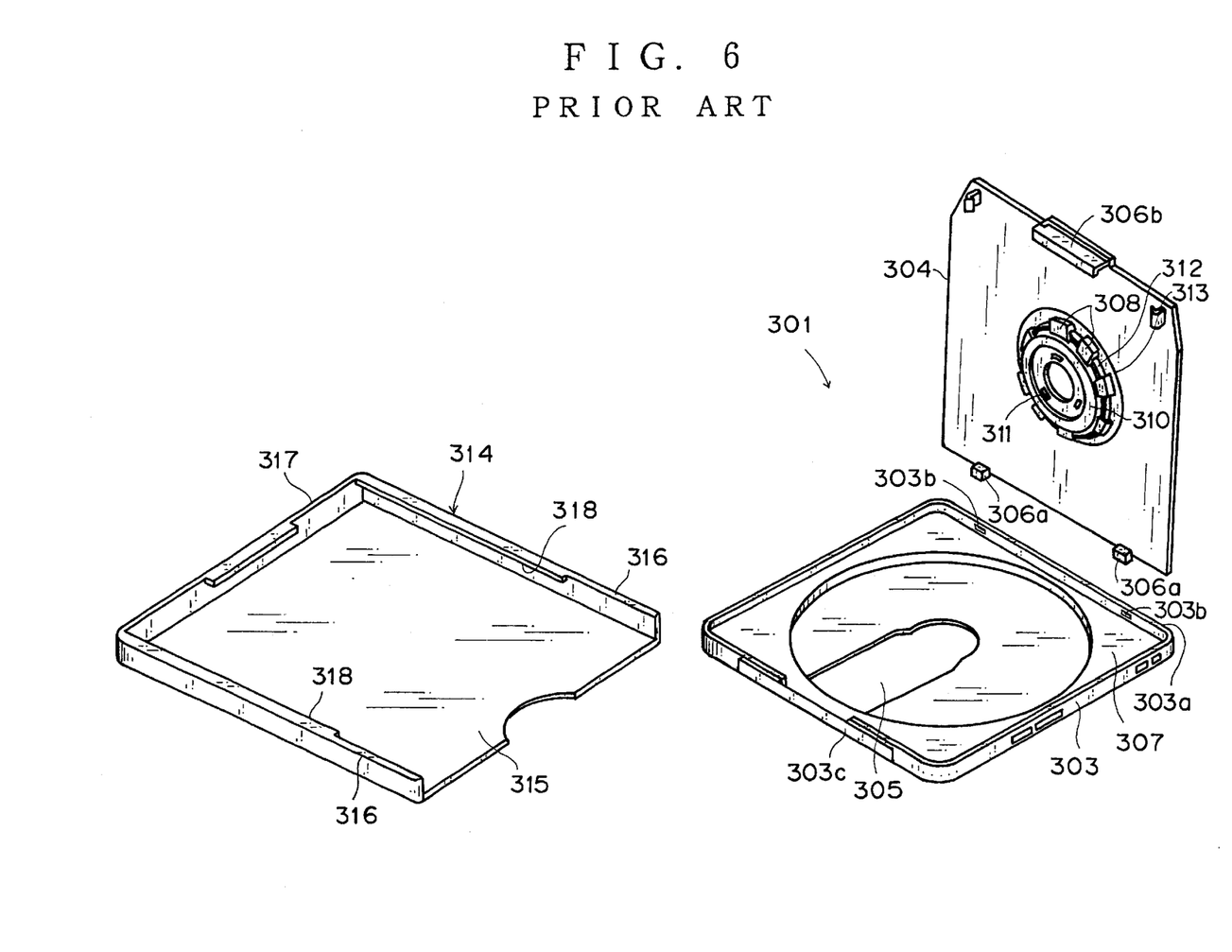
FIG. 6 is an exploded perspective view of another conventional cartridge for containing the disk type recording medium.

Under such situation, in order to prevent adhesion of dusts and the like on a surface of the disk type recording medium, there have been employed such cartridges 201, 301 as shown in FIGS. 5 and 6 which enable the disk type recording medium to be loaded into the information recording apparatus as they are encased in the cartridge.

A conventional cartridge 201 illustrated in FIG. 5 comprises a cartridge body 203 of a synthetic resin or the like which contains the disk type recording medium such as a compact disk (hereinafter referred to as CD) or DVD, and a lid body 204 of a synthetic resin or the like. The cartridge body 203 is formed in a shape of a box which can contain the disk type recording medium and includes a cavity 207 for taking in and out the disk type recording medium, and an opening 205 into which a recording and reproducing head and a rotary table of the information recording apparatus are adapted to be inserted.

A shutter 206 for opening and closing the opening 205 is slidably attached to the cartridge body 203. The shutter 206 is formed of a leaf metal or the like, and biased by a spring (not shown) in a direction of closing the opening 205.

The lid body 204 is formed in a shape of a plate having such a size that it can cover the cavity 207. One end of the lid body 204 is rotatably fixed to one end of the cartridge body 203, while the other end of the lid body 204 is provided with a locking piece 209 which can be locked with the other end of the cartridge body 203. In this manner the lid body 204 is fixed to the cartridge body 203 so that the cavity 207 can be opened and closed.

At the center of the lid body 204, is attached a clamp 210 provided with magnetic plates 211. The clamp 210 is inserted from outside into a circular opening 212 which is formed at the center of the lid body 204. Around the circular opening 212 is formed a flange 208 for preventing the clamp 210 from dropping into the lid body 204, that is, into the cartridge body 203.

The clamp 210 is inserted into the opening 212 from the outside of the lid body 204, and then, fixed to the lid body 204 by fitting a retaining plate 213 for covering the opening 212 to an outer face of the lid body 204.

The clamp 210 thus interposed between the flange 208 and the retaining plate 213 is fitted to the lid body 204 with a backlash so that it may minutely move in a direction of departing from the disk type recording medium contained in the cartridge body 203 and along a surface of the disk type recording medium.

When the cartridge 201 of the structure as described above and illustrated in FIG. 5 is loaded into the information recording apparatus with the disk type recording medium contained therein, the shutter 206 slidingly moves against a tension of the spring to open the opening 205. Then, the rotary table of the information recording apparatus enters into the cartridge body 203 through the opening 205.

On this occasion, a magnet fixed on the rotary table attracts the magnetic plates 211 of the clamp 210, and the disk type recording medium is centered and mounted on the rotary table. In a state where the disk type recording medium is centered and mounted, the clamp 210 is held at such a position that it may neither contact with the flange 208 nor the retaining plate 213. As the rotary table rotates, the disk type recording medium and the clamp 210 will rotate with the rotation of the rotary table to perform recording and reproduction of the desired information.

The cartridge 301 of the second conventional example illustrated in FIG. 6 comprises a cartridge body 303 of a synthetic resin or the like which contains the disk type recording medium such as the CD or DVD, and a lid body 304 of a synthetic resin or the like. The body 303 is formed in a shape of a box which can contain the disk type recording medium and includes a cavity 307 for taking in and out the disk type recording medium, and an opening 305 into which a recording and playback head and the rotary table of the information recording apparatus are adapted to be inserted. Further, the lid body 303 is provided with locking holes 303b which serve as locking retainers, at its peripheral wall 303a positioned at one end thereof.

The lid body 304 is formed in a shape of a plate having such a size that it can cover the cavity 307. One end of the lid body 304 is provided with locking projections 306a which are adapted to engage with the locking holes 303b, while the other end of the lid body 304 is provided with a locking piece 306b which can be locked with a peripheral wall 303c facing with the peripheral wall 303a of the body 303. In this manner the lid body 304 is fixed to the cartridge body 303 by an engagement of the locking projections 306a with the locking holes 303b and an engagement of the locking piece 306b with the peripheral wall 303c, so that the cavity 307 can be opened and closed.

At the center of the lid body 304, is attached a clamp 310 provided with magnetic plates 311. The clamp 310 is inserted from outside into a circular opening 312 which is formed at the center of the lid body 304. Around the circular opening 312 is formed a flange 308 for preventing the clamp 310 from dropping into the lid body 304, that is, into the cartridge body 303.

The clamp 310 is inserted into the opening 312 from the outside of the lid body 304, and then, fixed to the lid body 304 by fitting a retaining plate 313 for covering the opening 312 to an outer face of the lid body 304.

The clamp 310 thus interposed between the flange 308 and the retaining plate 313 is fitted to the lid body 304 with a backlash so that it may minutely move in a direction of departing from the disk type recording medium contained in the cartridge body 303 and along a surface of the disk type recording medium.

When the cartridge 301 is carried or stored with the disk type recording medium contained therein, the cartridge 301 is encased in a protective case 314 in order to prevent dusts from entering through the opening 305 and adhering to the surface of the disk type recording medium.

The protective case 314 is formed of a synthetic resin or the like, and consists of a flat bottom wall 315, a pair of side walls 316, 316 provided in an upright form from opposite edges of the bottom wall 315, and a rear wall 317 provided in an upright form from a rear edge of the bottom wall 315 connected to the side walls 316, 316, all of which are integrally formed.

The bottom wall 315 has a dimension larger than the cartridge 301 in width. The side walls 316, 316 have a height larger than a thickness of the cartridge 301. The side walls 316, 316 are respectively formed with inwardly projecting guide ridges 318, 318 in a longitudinal direction thereof. The side walls 316, 316 are further provided with cartridge retaining projections (not shown) adjacent to the rear wall 317 for detachably locking the cartridge 301.

With the above described structure, the protective case 314 contains the cartridge 301 in a state where the cartridge 301 is interposed between the bottom plate 315 and the ridges 318 with its opening 305 faced with the bottom wall 315. When the cartridge 301 is encased in the protective case 314, the cartridge 301 is guided along the side walls 316, 316 by the aid of the guide ridges 318, 318 to be abutted against the rear wall 317.

On this occasion, the cartridge retaining projections lock the cartridge 301 and prevent the cartridge 301 from unintentionally dropping. In this manner, the protective case 314 covers the opening 305 to prevent an intrusion of dusts and the like into the cartridge 301.

The cartridge 301 of the structure as described above and illustrated in FIG. 6 is removed from the protective case 314 and loaded into the information recording apparatus with the disk type recording medium contained therein. Then, the rotary table of the information recording apparatus enters into the cartridge 301 through the opening 305.

On this occasion, the magnet fixed on the rotary table attracts the magnetic plates 311 of the clamp 310, and the disk type recording medium is centered and mounted on the rotary table. In a state where the disk type recording medium is centered and mounted, the clamp 310 is held at such a position that it may neither contact with the flange 308 nor the retaining plate 313. When the rotary table rotates, the disk type recording medium and the clamp 310 will rotate with the rotation of the rotary table to perform recording and reproduction of the desired information.

However, in both the conventional cartridges 201, 301 illustrated in FIGS. 5 and 6, the lid bodies 204, 304 are provided with the clamps 210, 310 for centering the disk type recording medium. For this reason, the number of the components has been apt to increase.

Moreover, the number of assembling steps for fitting the clamps 210, 310 to the lid bodies 204, 304, for example, a step of forming the flanges 208, 308 around the openings 212, 312 of the lid bodies 204, 304, or a step of inserting the clamps 210, 310 into the openings 212, 312 and a step of attaching the retaining plates 213, 313, has been apt to increase. Therefore, there has been a tendency that a unit price of the conventional cartridges 210, 301 increases.

Further, in the conventional cartridges 201, 301, the clamps 210, 310 are attached to the lid bodies 204, 304 with the backlashes as described above. The disk type recording medium is centered by means of the clamps 210, 310 when the magnetic plates 211, 311 are attracted by the magnet on the rotary table.

For this reason, when the disk type recording medium having relatively high recording density such as the DVD is recorded and played back, it has been difficult to secure the required centering accuracy. The disk type recording medium is likely to get eccentric during the rotation, and it has been difficult to record the desired information in the disk type recording medium and to reproduce the recorded information with accuracy.

Furthermore, in the cartridge 201 illustrated in FIG. 5, the shutter 206 which is a separate member from the cartridge body 203 and the lid body 204 formed of the synthetic resin is slidably attached to the cartridge body 203. This shutter 206 is formed of the leaf metal or the like but not of the synthetic resin. The dimensional accuracy of this shutter 206 is maintained at relatively high grade in order to realize a smooth sliding movement of the shutter.

As described, because the conventional cartridge 201 is provided with the shutter 206 which is a separate body from the body 203 and the lid body 204 and formed of a different material, the number of the components has been increased. Further, because the shutter 206 is formed of the leaf metal or the like with relatively high dimensional accuracy, the manufacturing steps of the shutter 206 as well as the assembling steps in assembling the shutter 206 to the body 203 have been apt to increase. Accordingly, the unit price of the cartridge 201 as illustrated in FIG. 5 has been apt to increase the more.

In view of the above, an object of the invention is to provide a case for containing a disk type recording medium at a low cost which can protect the recording medium contained therein from dusts and the like enabling the recording and playback of this disk type recording medium to be reliably performed.

SUMMARY OF THE INVENTION

In order to solve the above described problems and to attain the object, there is provided, according to the present invention, a case for containing disk type recording medium provided with a center bore and a recording part, the case comprising a cartridge adapted to contain the disk type recording medium and including an opening through which at least a portion of the recording part of the disk type recording medium is exposed, and a protective case detachably mounted on the cartridge and adapted to cover the opening when mounted on the cartridge, the cartridge consisting of a first case member adapted to cover one surface of the disk type recording medium and including a center opening through which the center bore of the disk type recording medium and an adjacent area around the center bore are adapted to be exposed, and a first annular projection formed around the center opening and projecting toward the disk type recording medium, and a second case member adapted to cover the other surface of the disk type recording medium and including a center opening through which the center bore of the disk type recording medium and an adjacent area around the center bore are adapted to be exposed, the protective case including a second annular projection which enters into the center opening of the second case member to come into contact with the adjacent area around the center bore of the disk type recording medium.

According to the above described invention, the first case member and the second case member of the cartridge are both provided with the center openings through which the center bore of the disk type recording medium and the adjacent area around the center bore are exposed. Therefore, the cartridge can contain the disk type recording medium in a state where the center bore of the disk type recording medium and the adjacent area around the center bore are exposed.

This means that the clamp mechanism and the rotary table of the information recording apparatus can directly enter into the center bore of the disk type recording medium, when the disk type recording medium is loaded into the information recording apparatus. Therefore, centering and positioning of the disk type recording medium can be directly performed by the clamp mechanism and the rotary table of the information recording apparatus.

Further, although the first case member allows the center bore of the disk type recording medium and the adjacent area around the center bore to be exposed, the protective case is attached to the cartridge when the disk type recording medium is transported or stored. Then, by abutting the first annular projection and the second annular projection against the adjacent area around the center bore, the dusts and the like are prevented from entering into the cartridge through the adjacent area around the center bore of the disk type recording medium.

Still further, centering of the disk type recording medium can be performed without providing a separate clamp on either of the first case member and the second case member. The protective case covers the opening which is formed in either of the case members, and so, intrusion of the dusts and the like can be prevented without providing a shutter which is formed of a different material from the case members.

According to another aspect of the invention, when the protective case is mounted on the cartridge, the first annular projection comes into contact with the adjacent area around the center bore from the one surface of the disk type recording medium, and the second annular projection comes into contact with the adjacent area around the center bore from the other surface of the disk type recording medium.

According to the above described invention, when the protective case is mounted on the cartridge, the adjacent area around the center bore is interposed between the first annular projection and the second annular projection. Therefore, the intrusion of the dusts and the like into the cartridge can be more reliably prevented.

According to a further aspect of the invention, at least one of the first and second annular projections is formed of an elastic material at a portion including a contact face contacting the disk type recording medium.

The elastic material may preferably be rubber such as sponge rubber.

When the elastic portion formed of rubber or the like comes in contact with the disk type recording medium, it is preferable that the elastic portion is elastically rebound to bring the first annular projection, the disk type recording medium and the second annular projection into a tight contact. Accordingly, the intrusion of the dusts and the like into the cartridge can be more reliably prevented.

According to a still further aspect of the invention, the protective case comprises a plate part adapted to cover the second case member from outside, and a locking portion adapted to be locked with an edge of either one of the first and the second case members.

According to the above described invention, when the protective case is mounted on the cartridge, the plate part covers the opening. Accordingly, the intrusion of the dusts and the like into the cartridge can be more reliably prevented. Since the protective case is fixed to the cartridge by means of the locking portion adapted to be locked with the edge of the case member, upsizing of the case for containing the disk type recording medium in width can be restrained.

According to a still further aspect of the invention, the protective case comprises an engaging portion adapted to be engaged with the center bore of the disk type recording medium.

According to the above described invention, the disk type according medium contained in the cartridge is positioned and held by means of the engaging portion, when the protective case is mounted on the cartridge for transportation or storage. Accordingly, the surface of the disk type recording medium will not be scratched.

DESCRIPTION OF THE PREFERRED EMBODIMENT

Referring now to FIGS. 1 through 4, a preferred embodiment according to the present invention will be described.

A case 1 for containing a disk type recording medium as shown in FIGS. 1 through 4 is the case in which the disk type recording medium 2 such as a CD or DVD formed in a round shape and provided with a center bore 5 at a center portion thereof is adapted to be received.

Into the center bore 5 of the disk type recording medium 2, a clamp mechanism and a rotary table of an information recording apparatus such as a recorder for writing information on this disk type recording medium 2, or a player for playing back the information recorded in this disk type recording medium are adapted to enter.

The disk type recording medium 2 is provided with a clamped part 3 on which the information is not recorded and a recording part 4 which can record the information. The clamped part 3 is disposed adjacent to the center bore 5 around an outer circumference thereof and in an inner circumferential area of the disk type recording medium 2. The recording part 4 is disposed around an outer circumference of the clamped part 3 and in the outer circumferential area of the disk type recording medium 2.

As shown in FIGS. 1 through 4, the case 1 for containing the disk type recording medium comprises a cartridge 6 which can be loaded into the information recording apparatus with the above described disk type recording medium 2 contained therein, and a protective case 7.

The cartridge 6 has a lid body 11 formed of a synthetic resin or the like and referred to as a first case member in the claims, and a cartridge body 12 formed of a synthetic resin and referred to as a second case member in the claims.

The cartridge body 12 is formed in a box-like shape to to accommodate the disk type recording medium 2. The cartridge body 12 has a flat bottom wall 13 and a plurality of peripheral walls 14a, 14b, 14c and 14d which are provided in an upright form from an outer edge of the bottom wall 13 and connected to one another.

The bottom wall 13 is provided with a holding part 15 for holding the disk type recording medium 2, a center opening 16 and an opening 17. The holding part 15 includes a plurality of arcuate walls 18 which are formed in an arcuate shape in a plan view and upstand from the bottom wall 13. The holding part 15 hold the recording medium 2 on the bottom wall 13 surrounded with the arcuate walls 18.

The center opening 16 is disposed substantially at a center of the bottom wall 13. The center opening 16 passes through the bottom wall 13 and is formed in a substantially circular shape in a plan view. The center bore 5 of the recording medium 2 held by the holding part 15 and the clamped part 3 adjacent to the center bore 5 are exposed through the center opening 16. The rotary table in the information recording apparatus which rotates the recording medium 2 and the clamp mechanism for centering the recording medium 2 can intrude into the center opening 16.

The opening 17 is formed through the bottom wall 13 so as to extend from the center opening 16 up to an inner face of one of the arcuate walls 18. At least an area of a surface of the recording part 4 of the recording medium 2 is exposed through the opening 17. The center opening 16 and the opening 17 communicate with each other. In the illustrated embodiment, the opening 17 extends from the center opening 16 toward one peripheral wall 14c of the peripheral walls 14a, 14b, 14c, 14d. The recording and playback head of the information recording apparatus can intrude into the opening 17.

The one peripheral wall 14c of the peripheral walls 14a, 14b, 14c, 14d adjacent to the opening 17 is provided with hinge receiving portions 19 for receiving hinge portions 25 of the lid body 11 which will be described later. The hinge receiving portions 19 are formed at opposite ends of the peripheral wall 14c. Each of the hinge portions 19 is in a form of a recess across an end face and an inner face of the peripheral wall 14c.

Figure 1:
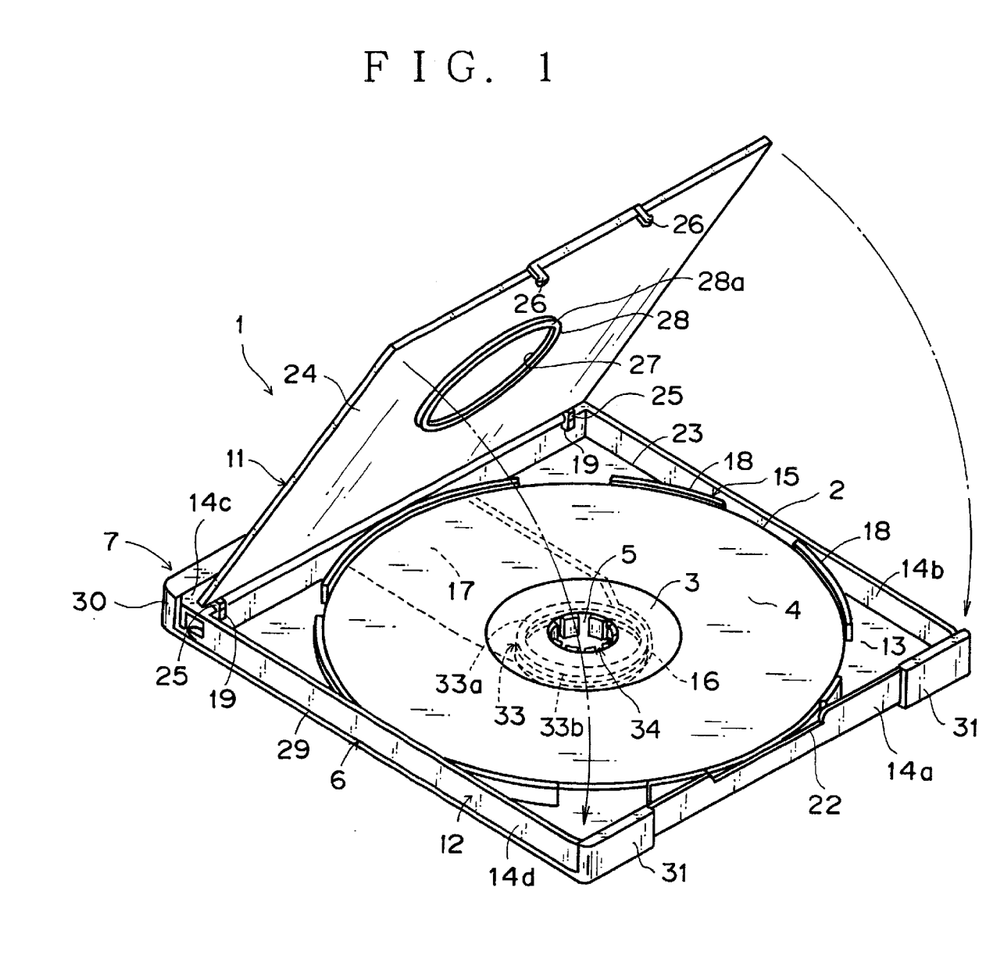
FIG. 1 is a perspective view of a case for containing a disk type recording medium according to one embodiment of the invention.
Figure 2:
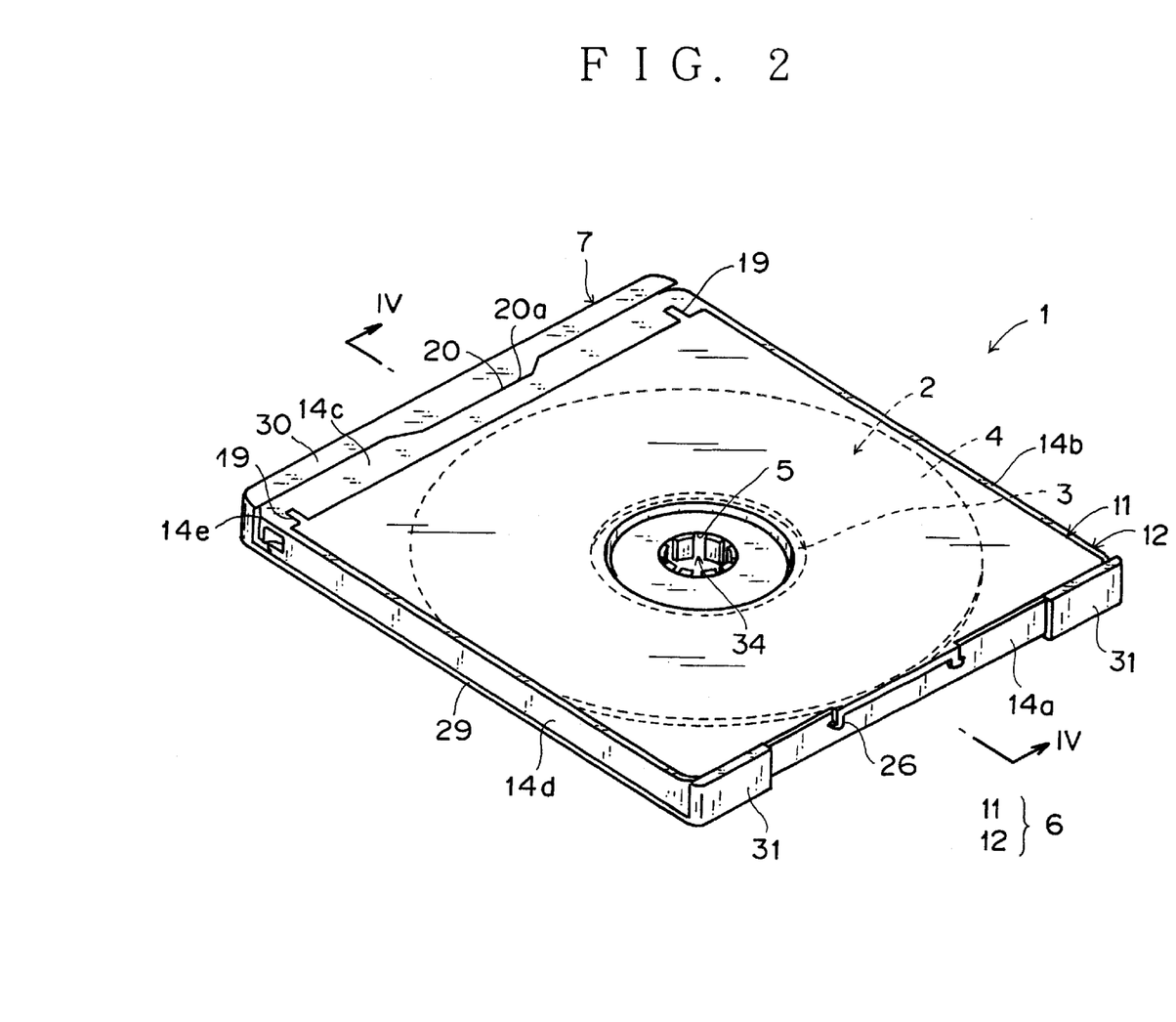
FIG. 2 is a perspective view of the case for containing the disk type recording medium according to the embodiment illustrated in FIG. 1 in a state where a lid body is closed.
Figure 3:
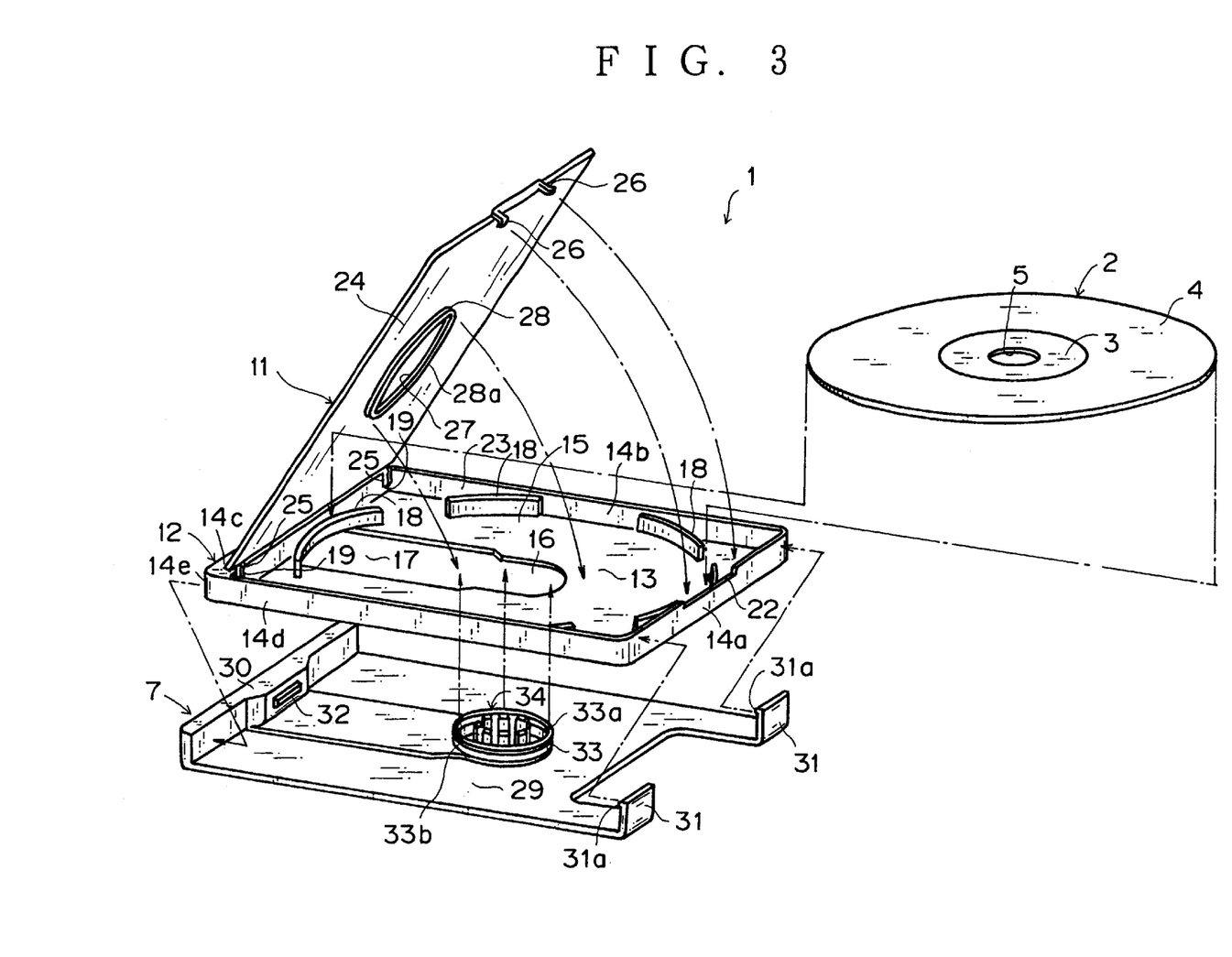
FIG. 3 is an exploded perspective view of the case for containing the disk type recording medium according to the embodiment illustrated in FIG. 1.
Figure 4:
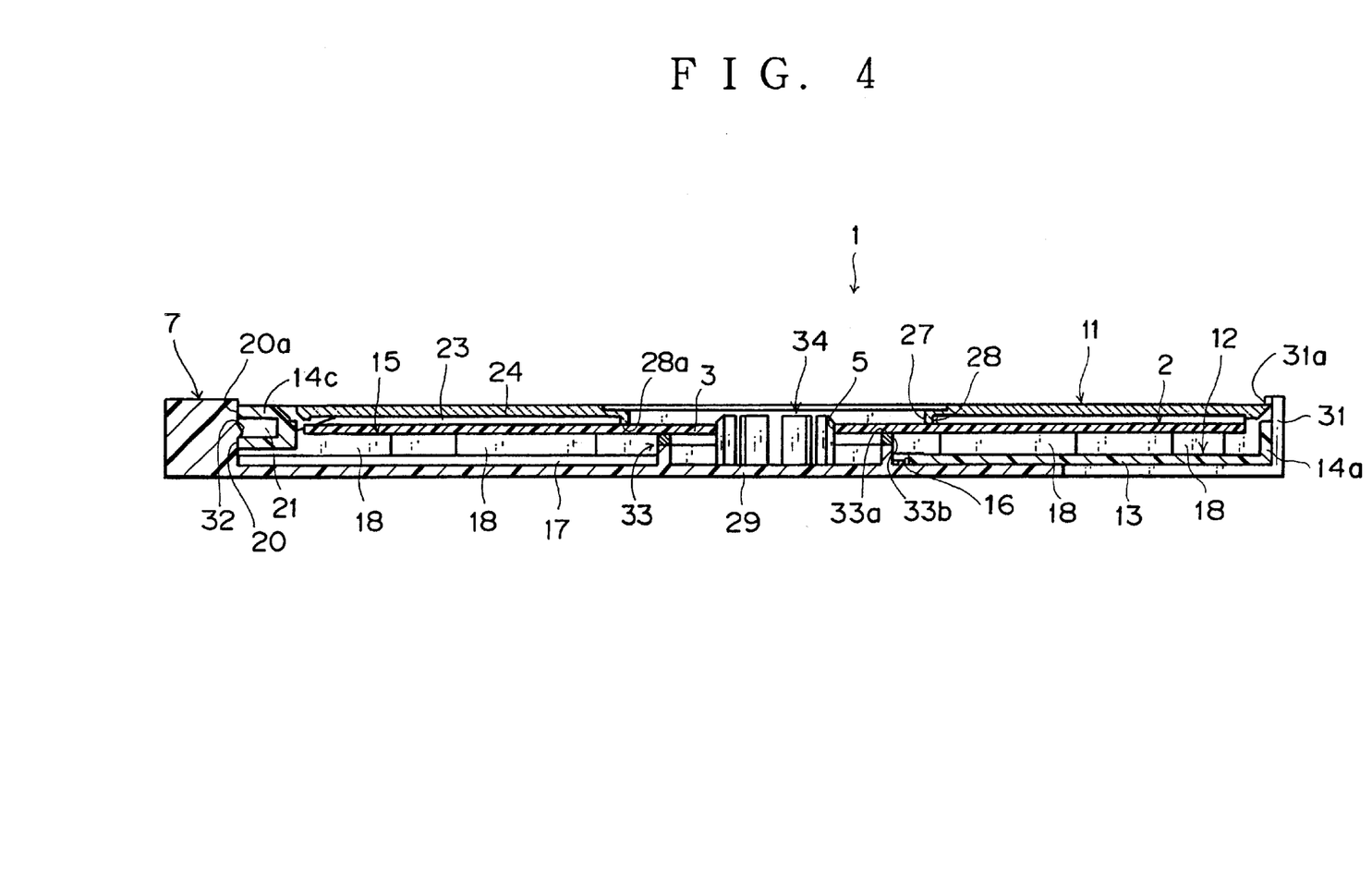
FIG. 4 is a sectional view taken along a line IV—IV in FIG. 2.

The peripheral wall 14c is further provided with a recess 20 formed from its outer face 14e at a middle part thereof as shown in FIG. 2. A bottom face 20a of this recess 20 is formed along the outer face 14e of the peripheral wall 14c. A groove 21 is formed in the bottom face 20a of the recess 20 in a longitudinal direction of the peripheral wall 14c as shown in FIG. 4.

The peripheral wall 14a of the cartridge body 12 opposite to the peripheral wall 14c which is formed with the hinge receiving portions 19 and the recess 20 is provided with locking portions 22 which are adapted to engage with locking pieces 26 of the lid body 11 which will be described later. A space surrounded by the peripheral walls 14a, 14b, 14c, 14d of the cartridge body 12 defines a cavity 23 through which the disk type recording medium 2 can be detachably received in the cartridge body 12, that is, inside the holding part 15.

The lid body 11 has a flat plate part 24, the hinge portions 25, the locking pieces 26 and a center opening 27. The plate part 24 is formed in a flat plate which has such a dimension as to cover the cavity 23. The hinge portions 25 are arranged at an outer edge positioned at one end of the plate part 24 outwardly projecting from opposite ends of the outer edge. The hinge portions 25 are adapted to be received respectively in the above described hinge receiving portions 19.

The locking pieces 26 are disposed at an outer edge of the plate part 24 positioned at the other end thereof. The locking pieces 26 are formed in a pair at positions apart from each other and in a hanging manner from the outer edge toward the cartridge body 12 when the hinge portions 25 are received in the hinge receiving portions 19. The locking pieces 26 are adapted to be engaged with the locking portions 22 formed on the peripheral wall 14a of the cartridge body 12.

The center opening 27 is formed substantially at a center of the plate part 24. The center opening 27 passes through the plate part 24 and is formed in a substantially circular shape in a plan view. The center bore 5 and the clamped part 3 adjacent to the center bore 5 of the recording medium 2 held by the holding part 15 are exposed through the center opening 27. The rotary table in the information recording apparatus which rotates the recording medium 2 and the clamp mechanism for centering the recording medium 2 can intrude into the center opening 27.

The lid body 11 is provided with a first annular projection 28 in an annular shape along a circumferential edge of the center opening 27. The annular projection 28 is formed in a hanging manner from a circumferential edge of the center opening 27 toward the cartridge body 12 when the hinge portions 25 are received in the hinge receiving portions 19. The first annular projection 28 is projectingly formed from a face of the plate part 24 of the lid body 11 facing with the cartridge body 12.

With the above described structure, the lid body 11 is fitted to the cartridge body 12 so as to open or close the cavity 23 by inserting the hinge portions 25 into the hinge receiving portions 19 and engaging the locking pieces 26 with the locking portions 22. The first annular projection 28 projects into the holding part 15 when the hinge portions 25 enters into the hinge receiving portions 19 and the locking pieces 26 engage with the locking portions 22.

On this occasion, an end face 28a of the first annular projection 28 faces with the bottom wall 13. This end face 28a acts as a contact face which is adapted to contact the disk type recording medium 2. When the lid body 11 is fixed to the cartridge body 12 so as to cover the cavity 23, the lid body 11 covers one face of the disk type recording medium 2, while the cartridge body 12 covers the other face of the disk type recording medium 2.

The protective case 7 is formed of an elastically deformable synthetic resin or the like and consists of a flat plate part 29, the cartridge body receiving part 30, and locking pieces 31. The plate part 29 is formed in a shape of a plate having a substantially same size as the bottom wall 13 of the cartridge body 12. The plate part 29 is overlapped on the bottom face of the bottom wall 13 of the cartridge body 12 to cover the cartridge body 12 from outside. The plate part 29 covers the opening 17 and the center opening 16 of the cartridge body 12 when it is overlapped on the bottom face of the bottom wall 13.

The cartridge body receiving part 30 is formed in an upright form from an outer edge of the plate part 29 positioned at one end thereof. The cartridge body receiving part 30 is adapted to be abutted against the outer face 14e of the peripheral wall 14c of the cartridge body 12. As shown in FIG. 4, the cartridge body receiving part 30 is provided with a projection 32 to be inserted into the groove 21 formed on the bottom face 20a of the recess 20 of the peripheral wall 14c. The projection 32 is formed so as to project toward the cartridge body 12, when the plate part 29 is overlapped on the bottom face of the bottom wall 13.

The locking pieces 31 are formed in an upright form from an outer edge of the plate part 29 positioned at the other end thereof. The locking pieces 31 are provided respectively at both ends of the outer edge. The locking pieces 31 are respectively provided with hook portions 31a which are adapted to hook an end face of the peripheral wall 14a, which is an edge of the cartridge body 12, when the projection 32 of the cartridge body receiving part 30 is inserted into the groove 21 and the plate part 24 is overlapped on the bottom wall 13. With the described structure, the locking pieces 31 are engaged with the edge of the cartridge body 12.

In order to mount the protective case 7 on the cartridge body 12, the projection 32 of the cartridge body receiving part 30 is inserted into the groove 21 to overlap the one end of the cartridge body 12 on the one end of the protective case 7, and the cartridge body 12 and the protective case 7 are displaced so that their other ends are drawn close to each other to hook the locking parts 31 on the end face of the peripheral wall 14a of the cartridge body 12. On this occasion, the plate part 29 of the protective case 7 and the bottom wall 13 of the cartridge body 12 are overlapped on each other, and the opening 17 is covered with the plate part 29.

In order to remove the protective case 7 from the cartridge body 12, the plate part 29 is elastically deformed in such a manner that the cartridge body receiving part 30 moves away from the cartridge body 12, the projection 32 is detached from the groove 21, and then, the locking pieces 31 are unlocked from the end face of the peripheral wall 14a.

The protective case 7 is provided with a second annular projection 33. The second annular projection 33 is formed in an upright form from the plate part 29 toward the cartridge body 12 when the protective case 7 is mounted on the cartridge body 12, and adapted to be inserted into the center opening 16. An end face 33a of the second annular projection 33 acts as a contact face which is adapted to contact the disk type recording medium 2.

Both the first annular projection 28 of the lid body 11 and the second annular projection 33 of the protective case 7 are formed at such heights that they may contact a surface of the clamped part 3 of the disk type recording medium 2, when the disk type recording medium 2 is received in the holding part 15, the cavity 23 is covered with the lid body 11, and the protective case 7 is mounted on the cartridge body 12. When the first and the second annular projections 28, 33 have come into contact with the disk type recording medium 2, the disk type recording medium 2 will be interposed between the bottom wall 13 and the plate part 24 and will take a position apart from the bottom wall 13 and the plate part 24 in a direction of thickness of the cartridge body 12 as shown in FIG. 4.

In the illustrated embodiment, a portion 33b including the contact face 33a for the disk type recording medium 2 at a tip end of the second annular projection 33 is formed of rubber as an elastic material such as sponge rubber or the like as shown in FIG. 4.

This portion 33b formed of rubber or the like will be elastically deformed so as to be reduced in thickness, when the first and the second annular projections 28, 33 have come into contact with the clamped part 3 of the disk type recording medium 2. Then, the portion 33b formed of rubber or the like will be elastically rebound to bring the first annular projection 28, the disk type recording medium 2, and the second annular projection 33 into a tight contact.

Moreover, the protective case 7 is provided with an engaging portion 34 which is disposed substantially at the center of the plate part 29 and inward of the second annular projection 33 in an upright form from the plate part 29. The engaging portion 34 is adapted to be engaged with the center bore 5 of the disk type recording medium 2 without a backlash therewith.

When the disk type recording medium 2 is received in the holding part 15, the cavity 23 is covered with the lid body 11, and the protective case 7 is mounted on the cartridge body 12, the engaging portion 34 is engaged with the center bore 5 to position the disk type recording medium 2 so that the outer circumference thereof may not contact with inner faces of the arcuate walls 18 of the holding part 15. In this manner, the engaging portion 34 will serve to position the disk type recording medium 2 in parallel to the plate part 29 and the bottom wall 13.

In the above described structure, the case 1 contains the disk type recording medium 2 for transporting and storing purpose, in a state where the protective case 7 is mounted on the cartridge body 12 as described before, the disk type recording medium 2 is placed in the holding part 15 through the cavity 23, and the cavity 23 is covered with the lid body 11.

On this occasion, the locking pieces 31 of the protective case 7 is not locked with the lid body 11, and the lid body 11 is free to open with respect to the cartridge body 12. By opening or closing the lid body 11 at the transportation and storing, the disk type recording medium 2 contained in the cartridge body 12 can be entered or removed.

In order to write information on the disk type recording medium 2 by means of the information recording apparatus or reproduce the information recorded on the disk type recording medium 2, the protective case 7 is detached from the cartridge 6. The cartridge 6 containing the disk type recording medium 2 and having the cavity 23 closed with the lid body 11 is loaded into the information recording apparatus. Then, the clamp mechanism of the information recording apparatus enters in either one of the center openings 16 and 27 to center the disk type recording medium 2.

Then, the rotary table of the information recording apparatus will enter in the other of the center openings 16 and 27 to position the disk type recording medium 2. The recording and playback head of the information recording apparatus will enter into the cartridge 6 through the opening 17 and conduct recording or reproduction on the recording part 4 of the disk type recording medium 2 while rotating the disk type recording medium 2 by means of the rotary table.

It is preferred on this occasion that the clamp mechanism of the information recording apparatus enters in the center opening 27 and the rotary table enters in the center opening 16. However, the information recording apparatus may be of such a structure that the clamp mechanism enters in the center opening 16 and the rotary table enters in the center opening 27.

The case 1 for containing the disk type recording medium according to this embodiment is so constructed that the cartridge body 12 and the lid body 11 of the cartridge 6 are respectively provided with the center openings 16, 27 through which the clamped part 3 of the disk type recording medium 2 is exposed. Accordingly, the clamp mechanism or the rotary table of the information recording apparatus can directly enter in the center bole 5 of the disk type recording medium 2 and position the disk type recording medium 2 by centering it.

For this reason, the disk type recording medium 2 can be centered and rotated maintaining such positioning accuracy as required when the disk type recording medium 2 having high recording density such as DVD or the like is recorded and played back. Accordingly, because an eccentricity of the rotation of the disk type recording medium 2 will be refrained, the desired information can be reliably recorded in this disk type recording medium 2 and the information recorded in this disk type recording medium 2 can be accurately reproduced.

Even though the clamped part 3 of the disk type recording medium 2 is exposed through the lid body 11 during the transportation and recording, the first and the second annular projections 28 and 33 are kept in contact with the clamped part 3. In other words, the disk type recording medium 2 is interposed between the first annular projection 28 and the second annular projection 33. Because the portion 33b including the contact face 33a of the second annular projection 33 is formed of the elastic material such as the rubber or the like, the annular projections 28, 33 and the disk type recording medium 2 are brought into a tight contact by means of the rebounding force of the elastic material.

Accordingly, the dusts and the like will be prevented from entering into the cartridge 6 through the exposed clamped part 3. Thus, the dusts and the like will be surely prevented from sticking to the disk type recording medium 2.

Further, centering of the disk type recording medium 2 can be conducted without providing a separate clamp on either of the lid body 11 and the cartridge body 12. The protective case 7 covering the opening 17 will prevent the dust and the like from entering into the cartridge 6 without providing a shutter or the like to cover the opening 17.

Therefore, because there is no need of providing the separate clamp or shutter, the components as well as the assembling steps can be decreased in number, and an increase of the cost for the product can be restrained.

The protective case 7 is mounted on the cartridge 6 with the locking pieces 31 hooked with the edge of the cartridge body 12, upsizing of the protective case 7 in a direction of the width of the cartridge 6 can be restrained. Thus, the cartridge 6 of the case 1 for containing the disk type recording medium 2 in a direction of the width of the cartridge 6 can be downsized.

During the transportation or the storage, the disk type recording medium 2 is positioned between the bottom wall 13 and the plate part 24 to be interposed between the annular projections 28, 33, while the engaging portion 34 is engaged with the center bore so that the outer circumference of the disk type recording medium 2 may not contact the arcuate walls 18. Therefore, the disk type recording medium 2 will be free from scratches on the surface.

Still further, because the one portion 33b including the contact face 33a of the second annular projection 33 is formed of the elastic material, the disk type recording medium 2 will be further prevented from being scratched on the surface.

Although the one portion 33b including the contact face 33a of the second annular projection 33 is formed of the elastic material in the described embodiment, the one portion including the contact face 28a of the second annular projection 28 may be also formed of the elastic material, or only the one portion including the contact face 28a of the second annular projection 28 may be formed of the elastic material.

In other words, it is preferred that at least one of the one portions including the contact faces 28a, 33a of the first and the second annular projections 28, 33 may be formed of the elastic material. In case where the disk type recording medium 2 can be positioned by being clamped between the annular projections 28, 33, the one portions including the contact faces 28a, 33a need not be formed of the elastic material such as rubber or the like. In this case, both the annular projections 28, 33 may be formed of synthetic resin or the like.

When the protective case 7 is mounted on the cartridge body 12, the locking pieces 31 of the protective case 7 may be locked with the edge of the lid body 11, provided that it is not necessary to hold the disk type recording medium 2 detachably in the cartridge body 12. Moreover, the lid body 11 may be fixed to the cartridge body 12 for constituting the cartridge 6, provided that it is not necessary to interchangeably contain the disk type recording medium 2 in the cartridge 6.

What is claimed is:

1. A case for containing disk type recording medium provided with a center bore and a recording part, said case comprising a cartridge adapted to contain said disk type recording medium and including an opening through which at least a portion of said recording part of said disk type recording medium is exposed, and a protective case detachably mounted on said cartridge and adapted to cover said opening when mounted on said cartridge, said cartridge consisting of
a first case member adapted to cover one surface of said disk type recording medium and including a center opening through which said center bore of said disk type recording medium and an adjacent area around said center bore are adapted to be exposed, and a first annular projection formed around said center opening and projecting toward said disk type recording medium, and
a second case member adapted to cover the other surface of said disk type recording medium and including a center opening through which said center bore of said disk type recording medium and an adjacent area around said center bore are adapted to be exposed,
said protective case including a second annular projection which enters into said center opening of said second case member to come into contact with said adjacent area around said center bore of said disk type recording medium.

2. The case for containing the disk type recording medium according to claim 1, wherein when said protective case is mounted on said cartridge,
said first annular projection comes into contact with said adjacent area around said center bore from said one surface of said disk type recording medium, and
said second annular projection comes into contact with said adjacent area around said center bore from said other surface of said disk type recording medium.

3. The case for containing the disk type recording medium according to claim 1 or 2, wherein at least one of said first and second annular projections is formed of an elastic material at a portion including a contact face contacting said disk type recording medium.

4. The case for containing the disk type recording medium according to any one of claims 1 through 3, wherein said protective case comprises a plate part adapted to cover said second case member from outside, and a locking portion adapted to be locked with an edge of either one of said first and said second case members.

5. The case for containing the disk type recording medium according to any one of claims 1 through 4, wherein said protective case comprises an engaging portion adapted to be engaged with said center bore of said disk type recording medium.

* * * * *